United States Patent
Lee

(10) Patent No.: US 8,085,015 B2
(45) Date of Patent: Dec. 27, 2011

(54) CURRENT BALANCING CIRCUIT AND METHOD

(75) Inventor: Kisun Lee, Tempe, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 545 days.

(21) Appl. No.: 12/265,064

(22) Filed: Nov. 5, 2008

(65) Prior Publication Data

US 2010/0109621 A1 May 6, 2010

(51) Int. Cl.
G05F 1/575 (2006.01)
G05F 1/59 (2006.01)

(52) U.S. Cl. .................. 323/272; 323/213; 323/284

(58) Field of Classification Search .................. 323/225, 323/271, 272, 283, 284, 285, 212, 213
See application file for complete search history.

(56) References Cited

U.S. PATENT DOCUMENTS

| | | | |
|---|---|---|---|
| 7,414,383 B2 * | 8/2008 | Burton et al. ............... | 323/271 |
| 7,592,787 B2 * | 9/2009 | Qui et al. .................... | 323/272 |
| 7,733,675 B2 * | 6/2010 | Wu et al. .................... | 363/65 |
| 7,923,974 B2 * | 4/2011 | Martin et al. ............... | 323/212 |

OTHER PUBLICATIONS

Abu-Qahouq et al., Multiphase Voltage-Mode Hysteretic Controlled DC-DC Converter With Novel Current Sharing, IEEE Transactions on Power Electronics, vol. 19, No. 6, Nov. 2004.
Sun, Dynamic Performance Analyses of Current Sharing Control for DC/DC Converters, Dissertation submitted to the Faculty of the Virginia Polytechnic Institute and State University in partial fulfillment of the requirements for the degree of Doctor of Philosophy in Engineering. Jun. 13, 2007; Blacksburg, Virginia.

* cited by examiner

*Primary Examiner* — Gary L Laxton
(74) *Attorney, Agent, or Firm* — Rennie William Dover

(57) ABSTRACT

A multi-phase power converter and a method for balancing a plurality of currents in the multi-phase power converter. The multi-phase power converter has a pulse width modulation circuit, a current ordering circuit, and a plurality of currents, wherein each current of the plurality of currents has an associated phase. The converter determines the phase associated with one or more currents of a plurality of currents and whether a phase associated with one or more currents of the plurality of currents is active. The current levels of the plurality of currents are determined and a phase associated with a current having one of a lowest current level or a highest current level is activated.

17 Claims, 3 Drawing Sheets

CURRENT BALANCING CIRCUIT AND METHOD

TECHNICAL FIELD

This invention relates, in general, to power converters and, more particularly, to multi-phase power converters.

BACKGROUND

Power converters are used in a variety of electronic products including automotive, aviation, telecommunications, and consumer electronics. Power converters such as Direct Current to Direct Current ("DC-DC") converters have become widely used in portable electronic products such as laptop computers, personal digital assistants, pagers, cellular phones, etc., which are typically powered by batteries. DC-DC converters are capable of delivering multiple voltages from a single voltage independent of the load current being drawn from the converter or from any changes in the power supply feeding the converter. One type of DC-DC converter that is used in portable electronic applications is a buck converter. This converter, also referred to as a switched mode power supply, is capable of switching an input voltage from one voltage level to a lower voltage level. A buck converter is typically controlled by a controller that can be configured to be a multi-phase controller having a plurality of output current channels that switch at different times. The output currents flowing in the output current channels are summed and delivered to the load. An advantage of this configuration is that each channel conducts a portion of the total load current. For example, in a 4-phase buck controller, each channel conducts 25% of the output current. This lowers the power dissipated by each output. A drawback with a multi-phase buck controller is that when the currents are not balanced, one of the current channels will conduct more current than the other current channels, which could lead to thermal failure. Another drawback is that a dynamic load coupled to the controller may have the same repetition rate as one of the outputs of the multi-phase buck converter. In this case, the currents in the channels become unbalanced causing the converter to suffer thermal failure.

Accordingly, it would be advantageous to have a multi-phase controller circuit and a method of operating the multi-phase converter circuit that maintains a balanced current at its outputs. In addition, it is desirable for the multi-phase controller circuit to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Figure 1:
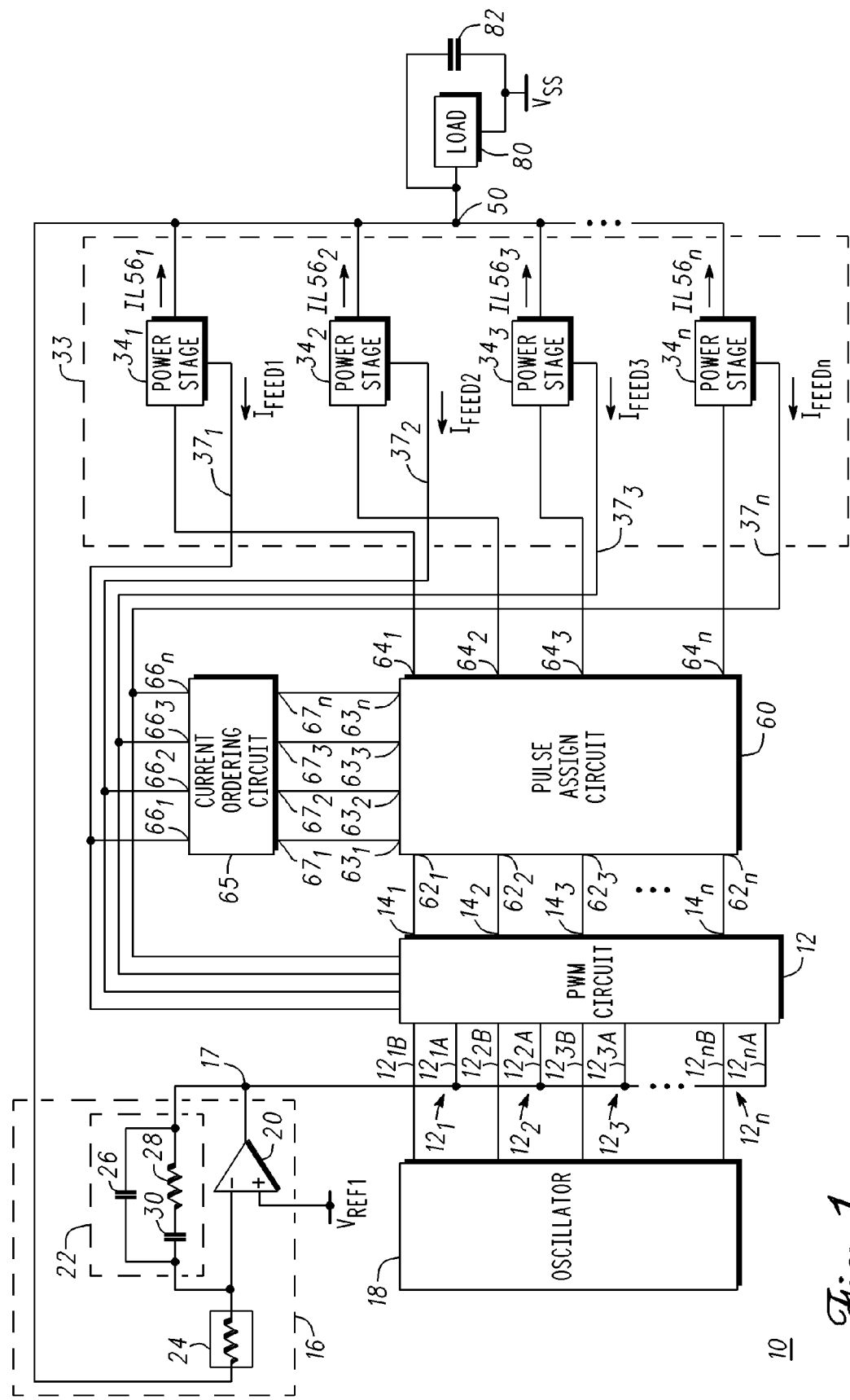
FIG. 1 is a schematic diagram of a multi-phase converter circuit in accordance with an embodiment of the present invention.
Figure 2:
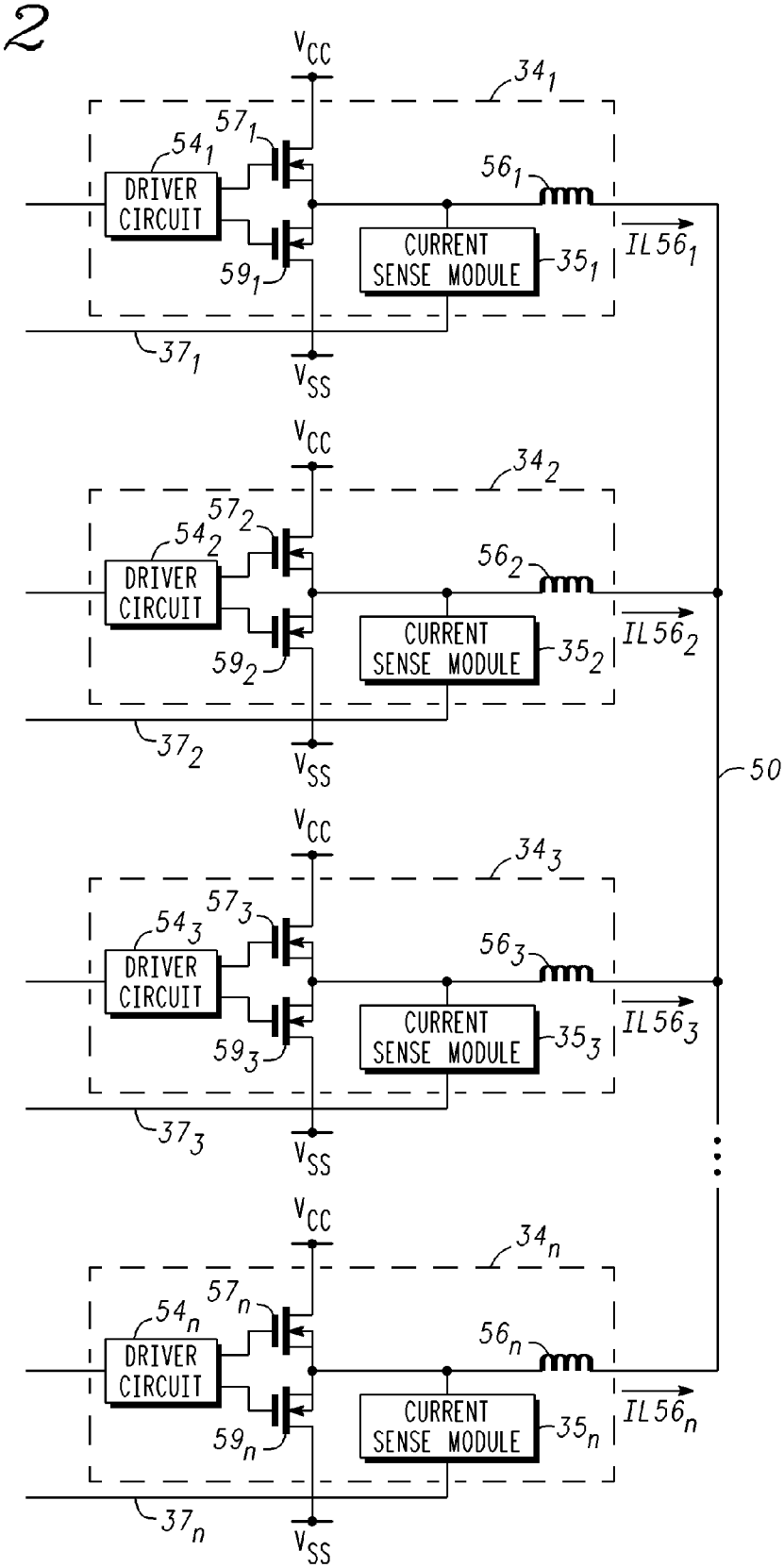
FIG. 2 is a schematic diagram of a portion of the multi-phase converter circuit of FIG. 1.

FIG. 1 is a block diagram of a multi-phase power converter 10 manufactured in a semiconductor substrate in accordance with an embodiment of the present invention. FIG. 2 is a block diagram of an embodiment of an output stage 33 of multi-phase power converter 10. It should be noted that FIGS. 1 and 2 will be described together. What is shown in FIG. 1 is a Pulse Width Modulator ("PWM") circuit 12 having "n" sets of inputs $12_1, 12_2, 12_3, \ldots, 12_n$, where "n" is an integer. Each of the "n" sets of inputs comprises an error input $12_{nA}$ and an oscillator input $12_{nB}$. It should be noted that the letters "A" and "B" are used in the reference characters to distinguish between error inputs and oscillator inputs, respectively. Thus, input $12_1$ comprises an error input $12_{1A}$ and an oscillator input $12_{1B}$; input $12_2$ comprises an error input $12_{2A}$ and an oscillator input $12_{2B}$; input $12_3$ comprises an error input $12_{3A}$ and an oscillator input $12_{3B}$; and input $12_n$ comprises an error input $12_{nA}$ and an oscillator input $12_{nB}$.

Multi-phase power converter 10 further includes an error amplifier 16 having an output 17 connected to error inputs $12_{1A}, 12_{2A}, 12_{3A}, \ldots, 12_{nA}$ and an oscillator 18 having a plurality of outputs, wherein the plurality of outputs are connected to corresponding oscillator inputs $12_{1B}, 12_{2B}, 12_{3B}, \ldots, 12_{nB}$. In accordance with an embodiment of the present invention, error amplifier 16 comprises an operational amplifier 20 connected in a negative feedback configuration in which an impedance 22 is coupled between the output of operational amplifier 20 and its inverting input and an impedance 24 is connected to the inverting input of operational amplifier 20. By way of example, impedance 22 comprises a capacitor 26 coupled in parallel with a series connected resistor 28 and capacitor 30, and impedance 24 comprises a resistor. The non-inverting input of operational amplifier 20 is coupled for receiving a reference voltage level $V_{REF1}$. It should be understood that the feedback configuration of error amplifier 16 is not a limitation of the present invention and that it may be realized using other feedback configurations known to those skilled in the art.

PWM circuit 12 is coupled to an output stage 33 comprising power stages $34_1, 34_2, 34_3, \ldots, 34_n$ through a pulse assign circuit 60, which has PWM inputs $62_1, 62_2, 62_3, \ldots, 62_n$, current ordering inputs $63_1, 63_2, 63_3, \ldots, 63_n$, and PWM outputs $64_1, 64_2, 64_3, \ldots, 64_n$. Outputs $14_1, 14_2, 14_3, \ldots, 14_n$ of PWM circuit 12 are connected to PWM inputs $62_1, 62_2, 62_3, \ldots, 62_n$ of pulse assign circuit 60, respectively. A current ordering circuit 65 having inputs $66_1, 66_2, 66_3, \ldots, 66_n$ and outputs $67_1, 67_2, 67_3, \ldots, 67_n$ is connected to pulse assign circuit 60, where inputs $66_1, 66_2, 66_3, \ldots, 66_n$ are connected to current ordering inputs $63_1, 63_2, 63_3, \ldots, 63_n$ of pulse assign circuit 60.

Power stages $34_1, 34_2, 34_3, \ldots, 34_n$ comprise driver circuits $54_1, 54_2, 54_3, \ldots, 54_n$, respectively, having inputs that serve as the inputs of power stage $34_1, 34_2, 34_3, \ldots, 34_n$, high-side driver outputs connected to the gates of the respective switching transistors $57_1, 57_2, 57_3, \ldots, 57_n$, and low-side driver outputs connected to the gates of the respective switching transistors $59_1, 59_2, 59_3, \ldots, 59_n$. The drains of high-side switching transistors $57_1, 57_2, 57_3, \ldots, 57_n$ are coupled for receiving a source of operating potential such as, for example, $V_{CC}$, and the sources of high-side switching transistors $57_1, 57_2, 57_3, \ldots, 57_n$ are connected to the respective drains of low-side switching transistors $59_1, 59_2, 59_3, \ldots, 59_n$. The sources of low-side switching transistors $59_1, 59_2, 59_3, \ldots, 59_n$ are coupled for receiving a source of operating potential such as, for example, $V_{SS}$. The commonly connected sources and drains of transistors $57_1, 57_2, 57_3, \ldots, 57_n$ and transistors $59_1, 59_2, 59_3, \ldots, 59_n$, respectively, are connected to a terminal of the respective energy storage elements $56_1, 56_2, 56_3, \ldots, 56_n$. The other terminals of energy storage elements $56_1, 56_2, 56_3, \ldots, 56_n$ serve as outputs of power stages $34_1$, $34_2, 34_3, \ldots, 34_n$ and are coupled together to form an output node 50. By way of example, energy storage elements $56_1, 56_2, 56_3, \ldots, 56_n$ are inductors.

PWM outputs $64_1, 64_2, 64_3, \ldots, 64_n$ of pulse assign circuit 60 are connected to corresponding inputs of power stages $34_1, 34_2, 34_3, \ldots, 34_n$, respectively. Outputs of power stages $34_1, 34_2, 34_3, \ldots, 34_n$ are connected to an output node 50. Power stages $34_1, 34_2, 34_3, \ldots, 34_n$ have current sense modules $35_1, 35_2, 35_3, \ldots, 35_n$, respectively, that generate feedback currents $I_{FEED1}, I_{FEED2}, I_{FEED3}, \ldots, I_{FEEDn}$ that are proportional to the currents flowing through energy storage elements $56_1, 56_2, 56_3, \ldots, 56_n$. Feedback current signals $I_{FEED1}, I_{FEED2}, I_{FEED3}, \ldots, I_{FEEDn}$, are fed back to PWM circuit 12 through feedback interconnects $37_1, 37_2, 37_3, \ldots, 37_n$, respectively and to inputs $66_1, 66_2, 66_3, \ldots, 66_n$ of current ordering circuit 65. Alternatively, current sense modules $35_1, 35_2, 35_3, \ldots, 35_n$ can be configured to generate feedback signals that are voltages. Circuit configurations for current sense modules are known to those skilled in the art.

A load 80 is coupled between output node 50 and a source of operating potential such as, for example, $V_{SS}$. An output capacitor 82 is connected in parallel with load 80. Output node 50 is connected in a feedback configuration to impedance 24 of error amplifier 16.

Figure 3:
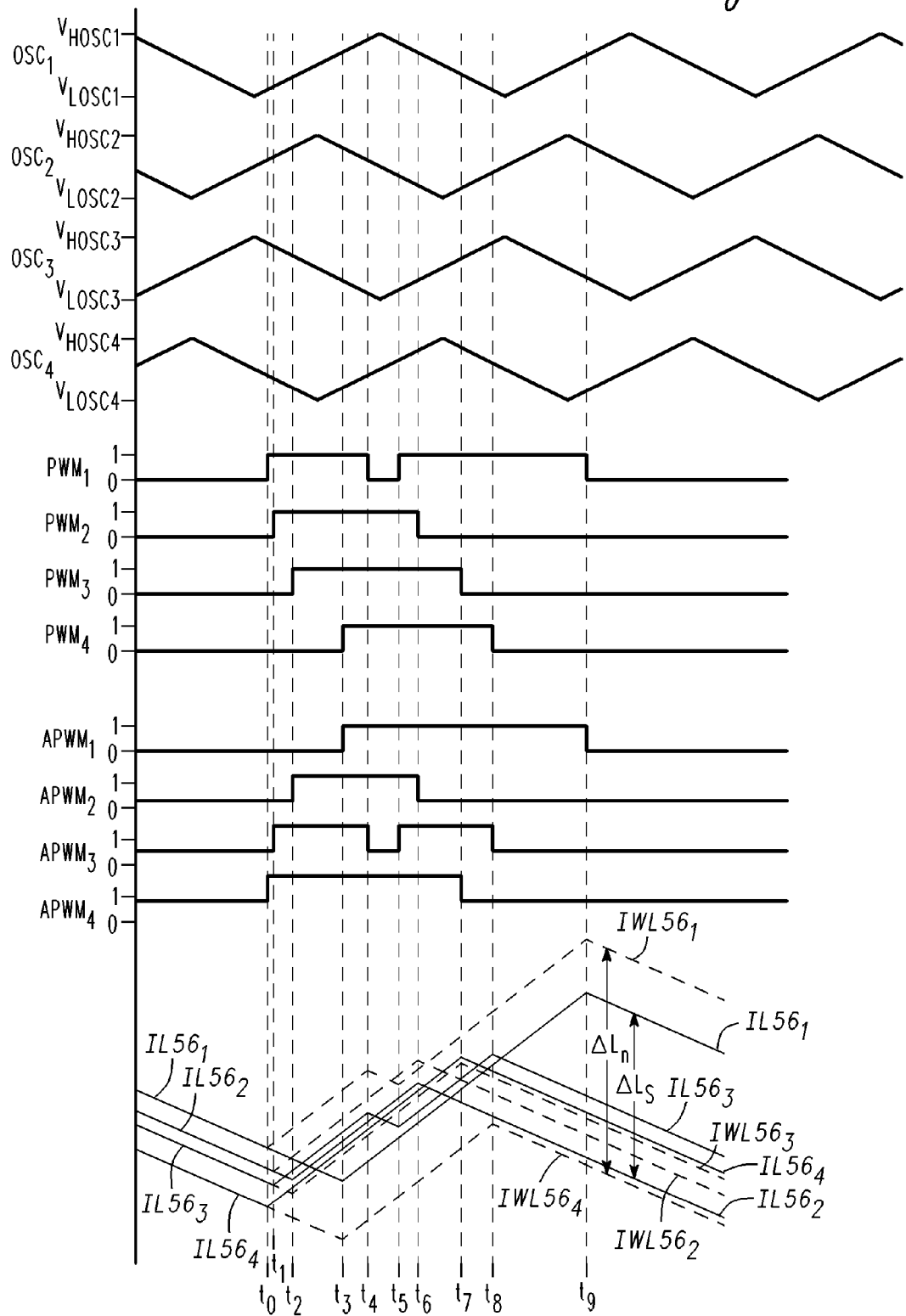
FIG. 3 is a timing diagram for a multi-phase converter circuit in accordance with an embodiment of the present invention.

FIG. 3 is a timing diagram 100 illustrating the temporal relationship among signals OSC1, OSC2, OSC3, and OSC4 from oscillator 18, pulse width modulated signals $PWM_1, PWM_2, PWM_3,$ and $PWM_4$ from PWM circuit 12 that are input into pulse assign circuit 60, assigned PWM signals $APWM_1, APWM_2, APWM_3,$ and $APWM_4$ from pulse assign circuit 60, and parameters such as, for example, inductor currents $IL56_1, IL56_2, IL56_3,$ and $IL56_4$. Timing diagram 100 is a timing diagram for a four-phase power converter, i.e., a power converter for which n=4, however, the number of phases is not a limitation of the present invention. Power converter 10 can be a two-phase power converter (n=2), a three-phase power converter (n=3), a four-phase power converter (n=4), etc. It should be noted that pulse assign circuit 60 receives pulse width modulated signals from PWM 12, i.e., signals $PWM_1, PWM_2, PWM_3,$ and $PWM_4$, and uses these signals as turn-on or turn-off signals for the inductor current phases. In other words, outputs $64_1, 64_2, 64_3, \ldots, 64_4$ of pulse assign circuit 60 are enabled or disabled by signals $PWM_1, PWM_2, PWM_3,$ and $PWM_4$ from PWM circuit 12, the current levels of inductor currents $IL56_1, IL56_2, IL56_3,$ and $IL56_4$, and whether one or more of outputs $64_1, 64_2, 64_3, \ldots, 64_4$ is enabled and conducting an output signal in accordance with one or more of the inductor current phases. If an output signal containing information from one or more of inductor currents $IL56_1, IL56_2, IL56_3, \ldots, IL56_4$ is being transmitted through one of outputs $64_1, 64_2, 64_3, \ldots, 64_4$ in accordance with one or more of signals $PWM_1, PWM_2, PWM_3,$ and $PWM_4$, the inductor phase current is turned on. For example, pulse assign circuit 60 may receive signal $PWM_1$ at its input $62_1$ that corresponds to inductor current $IL56_1$; however, pulse assign circuit 60 may enable output $64_4$, thereby transmitting the output signal associated with current $IL56_4$. In this case, the inductor current phase of signal $PWM_4$, or alternatively current $IL56_4$, is said to be turned-on, enabled, active, or activated. Changing the enabled output changes the output PWM signal that is transmitted and is therefore referred to as swapping the ramp signal or assigning the ramp signal. When a signal at outputs $64_1, 64_2, 64_3, \ldots, 64_n$ is at a logic low level, the inductor current phase is said to be turned-off or inactive.

As discussed before, timing diagram 100 illustrates triangular waveforms or ramp signals generated by oscillator 18 for a 4-phase power converter. What is shown in FIG. 3 is a triangular waveform $OSC_1$ having an amplitude ranging from voltage level $V_{LOSC1}$ to voltage level $V_{HOSC1}$, a triangular waveform $OSC_2$ having an amplitude ranging from voltage level $V_{LOSC2}$ to voltage level $V_{HOSC2}$, a triangular waveform $OSC_3$ having an amplitude ranging from voltage level $V_{LOSC3}$ to voltage level $V_{HOSC3}$, and a triangular waveform $OSC_4$ having an amplitude ranging from voltage level $V_{LOSC4}$ to voltage level $V_{HOSC4}$. Triangular waveforms $OSC_1$ and $OSC_2$ have phase angles that are separated by 90 degrees; triangular waveforms $OSC_2$ and $OSC_3$ have phase angles that are separated by 90 degrees; triangular waveforms $OSC_3$ and $OSC_4$ have phase angles that are separated by 90 degrees; and triangular waveforms $OSC_4$ and $OSC_1$ have phase angles that are separated by 90 degrees. Waveform $OSC_1$ lags waveform $OSC_2$ by 90 degrees; waveform $OSC_1$ lags waveform $OSC_3$ by 180 degrees; waveform $OSC_1$ lags waveform $OSC_4$ by 270 degrees. Waveforms $OSC_1$-$OSC_4$ have been shown as separate plots for the sake of clarity.

In response to signals $OSC_1, OSC_2, OSC_3,$ and $OSC_4$ from oscillator 18, an error signal from error amplifier 16, and feedback signals from power stages $34_1, 34_2, 34_3,$ and $34_4$, PWM circuit 12 generates pulse width modulated signals $PWM_1, PWM_2, PWM_3,$ and $PWM_4$ at outputs $14_1, 14_2, 14_3,$ and $14_4$, respectively. Signals $PWM_1, PWM_2, PWM_3,$ and $PWM_4$ are transmitted to pulse assign circuit 60 and serve as turn-on or turn-off signals as described above. In the example shown in FIG. 3, the turn-on operation is described with reference to times $t_0$-$t_3$, a turn-on turn-off operation is described with reference to times $t_4$ and $t_5$, and the turn-off operation is described with reference to times $t_6$-$t_9$. At time to, signals $PWM_1, PWM_2, PWM_3,$ and $PWM_4$ have been transmitted from PWM circuit 12 to PWM inputs $62_1, 62_2, 62_3,$ and $62_4$ of pulse assign circuit 60, respectively. At time $t_0$, signal $PWM_1$ transitions to a logic high level and signals $PWM_2, PWM_3,$ and $PWM_4$ remain at logic low levels. It should be noted that a logic low level is also referred to as a logic zero level and a logic high level is also referred to as a logic one level.

Current ordering circuit 65 compares the levels of currents $IL56_1, IL56_2, IL56_3,$ and $IL56_4$ at time $t_0$ with each other and transmits the current level information to pulse assign circuit 60. At time $t_0$, current $IL56_4$ has the lowest current level, current $IL56_3$ the second lowest current level, current $IL56_2$ the third lowest current level, and current $IL56_1$ the highest current level. In other words, current $IL56_1$ has the highest current level, current $IL56_2$ the second highest current level, current $IL56_3$ the third highest current level, and current $IL56_4$ the lowest current level. In response to signal PWM1 being at a logic high level, pulse assign circuit 60 determines whether any of the inductor current phases have been turned on. If none of the inductor current phases have been turned on, pulse assign circuit 60 enables output $64_4$ which then transmits the inductor current phase associated with the lowest inductor current level to output $64_4$ of pulse assign circuit 60. If one or more of the inductor current phases has been turned on, pulse assign circuit 60 enables the output of the inductor current phase associated with the current having the lowest level from among the inductor current phases that have been turned off, i.e., pulse assign circuit 60 swaps which output is enabled to an output associated with an inductor having the lowest inductor current. Pulse assign circuit 60 enables an output for an inductor current associated with an inductor current phase that has been turned-off.

In this example, all of the inductor current phases are turned-off at time $t_0$, thus pulse assign circuit 60 enables an output associated with an inductor having the lowest current level and where the associated inductor current phase is turned-off. Accordingly, pulse assign circuit 60 enables its output that is associated with the inductor current having the lowest current level, i.e., output $64_4$. In response to signal $PWM_1$ turning-on the inductor current phase that is associated with signal $PWM_4$, pulse assign circuit 60 enables output $64_4$ which conducts a PWM signal in accordance with the inductor current phase associated with inductor current $IL56_4$ rather than enabling output $64_1$ and conducting a PWM signal in accordance with the inductor current phase associated with current $IL56_1$, i.e., rather than turning on the inductor current phase associated with current $IL56_1$. Pulse assign circuit 60 stores information indicating that the inductor current phase associated with inductor current $IL56_4$ has been turned-on. The inductor current phases associated with signals PWM1, PWM2, and PWM3 remain off.

At time $t_1$, signal $PWM_2$ transitions to a logic high level, therefore, signal PWM1 remains at a logic high level, signals $PWM_3$ and $PWM_4$ remain at logic low levels and signal $PWM_2$ is now at a logic high level. Current ordering circuit 65 compares the current levels of currents $IL56_1$, $IL56_2$, $IL56_3$, and $IL56_4$ at time $t_1$ with each other and transmits the current level information to pulse assign circuit 60. At time $t_1$, current $IL56_4$ still has the lowest current level, current $IL56_3$ the second lowest current level, current $IL56_2$ the third lowest current level, and current $IL56_1$ the highest current level. In other words, current $IL56_1$ has the highest current level, current $IL56_2$ the second highest current level, current $IL56_3$ the third highest current level, and current $IL56_4$ the lowest current level. In response to signal $PWM_2$ being at a logic high level, pulse assign circuit 60 determines whether any of the inductor current phases have been turned on, selects the inductor current having the lowest current level from the inductor current phases that are turned off, i.e., the inductor current phases associated with inductor currents $IL56_1$, $IL56_2$, and $IL56_3$, and enables a corresponding output $64_1$, $64_2$, $64_3$, and $64_4$ to conduct a PWM signal in accordance with the inductor current phase associated with the inductor current. In this example, the inductor current phase associated with inductor current $IL56_4$ has been turned on as described above. Thus, pulse assign circuit 60 enables an output associated with an inductor current phase selected from the inductor current phases associated with inductor currents $IL56_1$, $IL56_2$, and $IL56_3$. Because inductor current $IL56_3$ is the lowest inductor current and the inductor current phase associated with inductor current $IL56_3$ is turned-off, pulse assign circuit 60 enables output $64_3$. Thus, in response to signal $PWM_2$ enabling output $64_3$, i.e., the output that conducts the inductor current phase associated with signal $PWM_3$, pulse assign circuit 60 swaps the inductor current phase associated with signal $PWM_2$ for the inductor current phase associated with signal $PWM_3$, i.e., pulse assign circuit 60 re-assigns the inductor current phase that is transmitted from pulse assign circuit 64 which re-assigns the PWM signal that is transmitted to output stage 33. In addition, pulse assign circuit 60 stores information indicating that the inductor current phase associated with inductor current $IL56_3$ has been turned on and that the inductor current phase associated with inductor current $IL56_4$ remains on. The inductor current phases associated with signals $PWM_1$ and $PWM_2$ remain off.

At time $t_2$, signal $PWM_3$ transitions to a logic high level, therefore signals $PWM_1$ and $PWM_2$ remain at a logic high level, signal $PWM_4$ remains at a logic low level, and signal $PWM_3$ is now at a logic high level. Current ordering circuit 65 compares the current levels of currents $IL56_1$, $IL56_2$, $IL56_3$, and $IL56_4$ at time $t_2$ with each other and transmits the current level information to pulse assign circuit 60. Current $IL56_4$ still has the lowest current level and current $IL56_1$ still has the highest current level, but current $IL56_2$ now has the second lowest current level and current $IL56_3$ now has the third lowest current level. In other words, current $IL56_1$ has the highest current level, current $IL56_3$ the second highest current level, current $IL56_2$ the third highest current level, and current $IL56_4$ the lowest current level. In response to signal $PWM_3$ being at a logic high level, pulse assign circuit 60 again determines whether any of the inductor current phases have been turned on, selects the inductor current having the lowest current level from the inductor current phases that are turned-off, i.e., the inductor current phases associated with inductor currents $IL56_1$ and $IL56_2$, and enables a corresponding output $64_1$, $64_2$, $64_3$, and $64_4$ to conduct a PWM signal in accordance with the inductor current phase associated with the inductor current. Because the inductor current phase associated with inductor currents $IL56_3$ and $IL56_4$ have been turned on, pulse assign circuit 60 selects an inductor current phase from the inductor current phases associated with inductor currents $IL56_1$ and $IL56_2$. Here, inductor current $IL56_2$ is the lowest inductor current hence pulse assign circuit 60 enables output $64_2$. Thus, in response to signal $PWM_3$ enabling output $64_2$, i.e., the output that conducts a PWM signal in accordance with the inductor current phase associated with signal $PWM_2$, pulse assign circuit 60 swaps the inductor current phase associated with signal $PWM_3$ for the inductor current phase associated with signal $PWM_2$, i.e., pulse assign circuit 60 re-assigns the inductor current phase that is transmitted from pulse assign circuit 64. In addition, pulse assign circuit 60 stores information indicating that the inductor current phase associated with inductor current $IL56_2$ has been turned on and that the inductor current phases associated with inductor current $IL56_3$ and $IL56_4$ remain on. The inductor current phase associated with signal PWM1 remains off.

At time $t_3$, signal $PWM_4$ transitions to a logic high level, therefore, signals $PWM_1$, $PWM_2$, and $PWM_3$ remain at a logic high level and signal $PWM_4$ is now also at a logic high level. Current ordering circuit 65 compares the current levels of currents $IL56_1$, $IL56_2$, $IL56_3$, and $IL56_4$ at time $t_3$ with each other and transmits the current level information to pulse assign circuit 60. At time $t_3$, current $IL56_4$ now has the second lowest current level, current $IL56_3$ now has the highest current level, current $IL56_2$ now has the third lowest current level, and current $IL56_1$ now has the lowest current level. In other words, current $IL56_3$ has the highest current level, current $IL56_2$ the second highest current level, current $IL56_4$ the third highest current level, and current $IL56_1$ the lowest current level. In response to signal $PWM_4$ being at a logic high level, pulse assign circuit 60 again determines whether any of the inductor current phases have been turned on, selects the inductor current having the lowest current level from the inductor current phases that are turned-off, i.e., the inductor current phases associated with inductor current $IL56_1$, and enables a corresponding output $64_1$, $64_2$, $64_3$, and $64_4$ to conduct a PWM signal in accordance with the inductor current phase associated with the inductor current. Because the inductor current phase associated with inductor currents $IL56_2$, $IL56_3$ and $IL56_4$ have been turned on, pulse assign circuit 60 selects the inductor current phase associated with inductor current $IL56_1$ because it is the one that is not turned on, i.e., it is turned off. Thus pulse assign circuit 60 enables output $64_1$. In response to signal $PWM_4$ enabling output $64_1$, i.e., the output that conducts a PWM signal in accordance with the inductor current phase associated with signal $PWM_1$, pulse assign circuit 60 swaps the PWM signal that is in accordance with the inductor current phase associated with signal $PWM_4$ for the PWM signal that is in accordance with the inductor current phase associated with signal $PWM_1$, i.e., pulse assign circuit 60 re-assigns the inductor current phase that it transmits. In addition, pulse assign circuit 60 stores information indicating that the inductor current phase associated with inductor current IL$56_1$ has been turned on and that the inductor current phases associated with inductor currents IL$56_2$, IL$56_3$, and IL$56_4$ remain on. The inductor current phases associated with signals PWM$_2$, PWM$_3$, and PWM$_4$ remain on.

At time $t_4$, signal PWM$_1$ transitions to a logic low level, therefore, signals PWM$_2$, PWM$_3$, and PWM$_4$ remain at a logic high level, whereas signal PWM$_1$ is now at a logic low level. Current ordering circuit 65 compares the current levels of currents IL$56_1$, IL$56_2$, IL$56_3$, and IL$56_4$ at time $t_4$ with each other and transmits the current level information to pulse assign circuit 60. At time $t_4$, current IL$56_4$ still has the second lowest current level, current IL$56_3$ still has the highest current level, current IL$56_2$ still has the third lowest current level, and current IL$56_1$ still has the lowest current level. In other words, current IL$56_3$ has the highest current level, current IL$56_2$ the second highest current level, current IL$56_4$ the third highest current level, and current IL$56_1$ the lowest current level. In response to signal PWM$_1$ being at a logic low level, pulse assign circuit 60 determines whether any of the inductor current phases have been turned off. If none of the inductor current phases have been turned off, pulse assign circuit 60 enables output 64$_3$ which then transmits a PWM signal in accordance with the inductor current phase associated with the highest inductor current level to output 64$_3$ of pulse assign circuit 60. If one or more of the inductor current phases has been turned off, pulse assign circuit 60 enables the output to conduct a PWM in accordance with the inductor current phase associated with the current having the highest current level from among the inductor current phases that have been turned on, i.e., pulse assign circuit 60 swaps which output is enabled to an output associated with an inductor having the highest inductor current. Pulse assign circuit 60 enables an output for an inductor current associated with an inductor current phase that has been turned-on.

In this example, all of the inductor current phases are turned-on at time $t_4$, thus pulse assign circuit 60 enables an output associated with an inductor current having the highest current level and where the associated inductor current phase is turned-on. Accordingly, pulse assign circuit 60 enables its output that is associated with the inductor current having the highest current level, i.e., output 64$_3$. In response to signal PWM$_1$ transitioning to a logic low level and turning off the inductor current phase associated with current IL$56_1$, pulse assign circuit 60 enables output 64$_3$ which conducts a PWM signal in accordance with inductor current IL$56_3$ rather than enabling output 64$_1$ and conducting a PWM signal in accordance with the inductor current phase associated with current IL$56_1$, i.e., pulse assign circuit 60 turns-off the inductor current phase associated with current IL$56_3$. Pulse assign circuit 60 stores information indicating that the inductor current phase associated with inductor current IL$56_3$ has been turned-off. The inductor current phases associated with signals PWM$_1$, PWM$_2$, and PWM$_4$ remain on.

At time $t_5$, signal PWM$_1$ transitions to a logic high level, therefore signals PWM$_1$, PWM$_2$, PWM$_3$, and PWM$_4$ are at a logic high level. Current ordering circuit 65 compares the current levels of currents IL$56_1$, IL$56_2$, IL$56_3$, and IL$56_4$ at time $t_5$ with each other and transmits the current level information to pulse assign circuit 60. At time $t_5$, current IL$56_4$ has the third lowest current level, current IL$56_3$ has the second lowest current level, current IL$56_2$ has the highest current level, and current IL$56_1$ still has the lowest current level. In other words, current IL$56_2$ has the highest current level, current IL$56_4$ the second highest current level, current IL$56_3$ the third highest current level, and current IL$56_1$ the lowest current level. In response to signal PWM$_1$ being at a logic high level, pulse assign circuit 60 again determines which of the inductor current phases have been turned off, selects the inductor current having the lowest current level from the inductor current phases that are turned-off, i.e., the inductor current phases associated with inductor current IL$56_3$, and enables a corresponding output 64$_1$, 64$_2$, 64$_3$, and 64$_4$ to conduct a PWM signal in accordance with the inductor current phase associated with the inductor current. Because the inductor current phase associated with inductor current IL$56_1$, IL$56_2$, and IL$56_4$ have been turned on, pulse assign circuit 60 selects the inductor current phase associated with inductor current IL$56_3$. Here, inductor current IL$56_3$ is the lowest inductor current hence pulse assign circuit 60 enables output 64$_3$. In response to signal PWM$_1$ enabling output 64$_3$ i.e., the output that conducts a PWM signal in accordance with the inductor current phase associated with signal PWM$_3$, pulse assign circuit 60 swaps the PWM signal that is in accordance with the inductor current phase associated with signal PWM$_1$ for the PWM signal that is in accordance with the inductor current phase associated with signal PWM$_3$, i.e., pulse assign circuit 60 re-assigns the PWM signal in accordance with the inductor current phase associated with the current having the lowest current level of the inductor current phases that are off. In addition, pulse assign circuit 60 stores information indicating that the inductor current phase associated with inductor current IL$56_3$ has been turned on and that the inductor current phases associated with inductor currents IL$56_1$, IL$56_2$, and IL$56_4$ remain on. The inductor current phases associated with signals PWM$_1$, PWM$_2$, PWM$_3$, and PWM$_4$ are on.

At time $t_6$, signal PWM$_2$ transitions to a logic low level, therefore signals PWM$_1$, PWM$_3$, and PWM$_4$ remain at a logic high level and signal PWM$_2$ is now at a logic low level. Current ordering circuit 65 compares the current levels of currents IL$56_1$, IL$56_2$, IL$56_3$, and IL$56_4$ at time $t_6$ with each other and transmits the current level information to pulse assign circuit 60. At time $t_6$, current IL$56_4$ still has the third lowest current level, current IL$56_3$ still has the second lowest current level, current IL$56_2$ still has the highest current level, and current IL$56_1$ still has the lowest current level. In other words, current IL$56_2$ has the highest current level, current IL$56_4$ the second highest current level, current IL$56_3$ the third highest current level, and current IL$56_1$ the lowest current level. In response to signal PWM$_2$ being at a logic low level, pulse assign circuit 60 determines whether any of the inductor current phases have been turned off. If none of the inductor current phases have been turned off, pulse assign circuit 60 enables output 64$_2$ which then transmits the inductor current phase associated with the highest inductor current level to output 64$_2$ of pulse assign circuit 60. If one or more of the inductor current phases has been turned off, pulse assign circuit 60 enables the output of the inductor current phase associated with the current having the highest current level from among the inductor current phases that have been turned on, i.e., pulse assign circuit 60 swaps which output is enabled to conduct a PWM signal associated with an inductor having the highest inductor current. Pulse assign circuit 60 enables an output for an inductor current associated with an inductor current phase that has been turned-on.

In this example, all of the inductor current phases are turned on at time $t_6$, thus pulse assign circuit 60 enables an output associated with an inductor current having the highest current level and where the associated inductor current phase is turned on. Accordingly, pulse assign circuit 60 enables its output that is associated with the inductor current having the highest current level, i.e., output $64_2$, to conduct a PWM signal in accordance with the inductor current phase associated with the current having the highest current level for the inductor current phases that are turned on. In response to signal $PWM_2$ transitioning to a logic low level and turning off the inductor current phase associated with current $IL56_2$, pulse assign circuit 60 enables output $64_2$ which conducts inductor current $IL56_2$. Pulse assign circuit 60 stores information indicating that the inductor current phase associated with inductor current $IL56_2$ has been turned-off. The inductor current phases associated with signals $PWM_1$, $PWM_3$, and $PWM_4$ remain on.

At time $t_7$, signal $PWM_3$ transitions to a logic low level, therefore signals $PWM_1$ and $PWM_4$ remain at logic high levels and signal $PWM_2$ and $PWM_3$ are at logic low levels. Current ordering circuit 65 compares the current levels of currents $IL56_1$, $IL56_2$, $IL56_3$, and $IL56_4$ at time $t_7$ with each other and transmits the current level information to pulse assign circuit 60. At time $t_7$, current $IL56_4$ now has the highest current level, current $IL56_3$ still has the third lowest current level, current $IL56_2$ now has the lowest current level, and current $IL56_1$ now has the second lowest current level. In other words, current $IL56_4$ has the highest current level, current $IL56_3$ the second highest current level, current $IL56_1$ the third highest current level, and current $IL56_2$ the lowest current level. In response to signal $PWM_3$ being at a logic low level, pulse assign circuit 60 determines whether any of the inductor current phases have been turned off. If none of the inductor current phases have been turned off, pulse assign circuit 60 enables output $64_4$ which then transmits a PWM signal in accordance with the inductor current phase associated with the highest inductor current level to output $64_4$ of pulse assign circuit 60. If one or more of the inductor current phases has been turned off, pulse assign circuit 60 enables the output to transmit a PWM signal in accordance with the inductor current phase associated with the current having the highest current level from among the inductor current phases that have been turned on, i.e., pulse assign circuit 60 swaps which output is enabled to an output associated with an inductor current phase that is associated with the highest inductor current. Pulse assign circuit 60 enables an output for an inductor current associated with an inductor current phase that has been turned-on.

In this example, the inductor current phase associated with inductor currents $IL56_1$, $IL56_3$, and $IL56_4$ are turned on. Thus, pulse assign circuit 60 selects an inductor current phase from the inductor current phases associated with inductor currents $IL56_1$, $IL56_3$, and $IL56_4$. Because inductor current $IL56_4$ has the highest current level, pulse assign circuit 60 enables output $64_4$ in response to signal $PWM_3$ transitioning to a logic low level. Accordingly, pulse assign circuit 60 enables a corresponding output $64_1$, $64_2$, $64_3$, and $64_4$ to conduct a PWM signal in accordance with an inductor current phase that is associated with the inductor current having the highest current level, i.e., inductor current $IL56_4$, rather than enabling output $64_3$ to conduct a PWM signal in accordance with an inductor current phase associated with current $IL56_3$, i.e., pulse assign circuit 60 turns-off the inductor current phase associated with current $IL56_4$. Pulse assign circuit 60 stores information indicating that the inductor current phase associated with inductor current $IL56_4$ has been turned-off. The inductor current phases associated with signals $PWM_1$ and $PWM_3$ remain on.

At time $t_8$, signal $PWM_4$ transitions to a logic low level, therefore signal PWM1 remains at a logic high level and signals $PWM_2$, $PWM_3$, and $PWM_4$ are at logic low levels. Current ordering circuit 65 compares the current levels of currents $IL56_1$, $IL56_2$, $IL56_3$, and $IL56_4$ at time $t_8$ with each other and transmits the current level information to pulse assign circuit 60. At time $t_8$, current $IL56_4$ now has the second lowest current level, current $IL56_3$ has the highest current level, current $IL56_2$ has the lowest current level, and current $IL56_1$ has the third lowest current level. In other words, current $IL56_3$ has the highest current level, current $IL56_1$ the second highest current level, current $IL56_4$ the third highest current level, and current $IL56_2$ the lowest current level. In response to signal $PWM_4$ being at a logic low level, pulse assign circuit 60 determines whether any of the inductor current phases have been turned off. If none of the inductor current phases have been turned off, pulse assign circuit 60 enables its output $64_3$ to conduct a PWM signal in accordance with the inductor current phase associated with the highest inductor current level. If one or more of the inductor current phases has been turned off, pulse assign circuit 60 enables the output to transmit a PWM signal in accordance with the inductor current phase associated with the current having the highest current level from among the inductor current phases that have been turned on, i.e., pulse assign circuit 60 swaps which output is enabled to an output associated with a PWM signal in accordance with an inductor current phase associated with the highest inductor current for an inductor current phase that is on. Pulse assign circuit 60 enables an output for an inductor current associated with an inductor current phase that has been turned-on.

In this example, the inductor current phase associated with inductor currents $IL56_1$ and $IL56_3$ are turned on. Thus, pulse assign circuit 60 selects an inductor current phase from the inductor current phases associated with inductor currents $IL56_1$ and $IL56_3$. Because inductor current $IL56_3$ has the highest current level, pulse assign circuit 60 enables a corresponding output $64_1$, $64_2$, $64_3$, and $64_4$ to conduct a PWM signal in response to signal $PWM_4$ transitioning to a logic low level. Accordingly, pulse assign circuit 60 enables output $64_3$ to conduct a PWM signal in accordance with the inductor current phase associated with the inductor current having the highest current level, i.e., pulse assign circuit 60 turns-off the inductor current phase associated with current $IL56_3$. Pulse assign circuit 60 stores information indicating that the inductor current phase associated with inductor current $IL56_3$ has been turned-off. The inductor current phase associated with signal PWM1 remains on.

At time $t_9$, signal $PWM_1$ transitions to a logic low level, therefore signals $PWM_1$, $PWM_2$, $PWM_3$, and $PWM_4$ are at a logic low level. Current ordering circuit 65 compares the current levels of currents $IL56_1$, $IL56_2$, $IL56_3$, and $IL56_4$ at time $t_9$ with each other and transmits the current level information to pulse assign circuit 60. At time $t_9$, current $IL56_4$ has the second lowest current level, current $IL56_3$ has the third lowest current level, current $IL56_2$ has the lowest current level, and current $IL56_1$ still has the highest current level. In other words, current $IL56_1$ has the highest current level, current $IL56_3$ the second highest current level, current $IL56_4$ the third highest current level, and current $IL56_2$ the lowest current level. In response to signal $PWM_1$ being at a logic low level, pulse assign circuit 60 determines whether any of the inductor current phases have been turned off. If none of the inductor current phases have been turned off, pulse assign circuit 60 enables its output $64_1$ to transmit a PWM signal in accordance with the inductor current phase associated with the highest inductor current level. If one or more of the inductor current phases has been turned off, pulse assign circuit 60 enables the output to transmit a PWM signal in accordance with the inductor current phase associated with the current having the highest current level from among the inductor current phases that have been turned on, i.e., pulse assign circuit 60 swaps which output is enabled to an output associated with a PWM signal that is in accordance with the inductor current phase associated with the highest inductor current for inductor current phases that are on.

In this example, the inductor current phase associated with inductor current $IL56_1$ is turned on. Thus, pulse assign circuit 60 selects the inductor current phase from the inductor current phases associated with inductor currents $IL56_1$. Because inductor current $IL56_1$ has the highest current level, pulse assign circuit 60 enables output $64_1$ to transmit a PWM signal in accordance with the inductor current phase associated with inductor current $IL56_1$ in response to signal $PWM_1$ transitioning to a logic low level, i.e., pulse assign circuit 60 turns-off the inductor current phase associated with current $IL56_1$. Pulse assign circuit 60 stores information indicating that the inductor current phase associated with inductor current $IL56_1$ has been turned-off. The inductor current phases associated with signals $PWM_1$, $PWM_2$, $PWM_3$, and $PWM_4$ are off. In other words, the inductor current phases associated with inductor currents $IL56_1$, $IL56_2$, $IL56_3$, and $IL56_4$ have been turned off.

FIG. 3 further illustrates that swapping inductor current phases in accordance with embodiments of the present invention decreases the difference between the highest and lowest inductor current levels. More particularly, FIG. 3 illustrates inductor currents $IL56_1$, $IL56_2$, $IL56_3$, and $IL56_4$ that have been swapped as solid lines and currents $ILW56_1$, $ILW56_2$, $ILW56_3$, and $ILW56_4$ that have not been swapped as broken lines. The difference between the lowest and highest currents that have been swapped is identified by reference character $\Delta L_S$ and the difference between the lowest and highest currents that have not been swapped is identified by reference character $\Delta L_N$. Current difference $\Delta L_S$ is less than current difference $\Delta L_N$ illustrating that a multi-phase power module operating in accordance with embodiments of the present invention balances currents. Another advantage of embodiments of the present invention is conservation of current and power.

By now it should be appreciated that a multi-phase power converter and a method for balancing a plurality of currents in the multi-phase power converter have been provided. In accordance with embodiments of the present invention, current balancing is accomplished by distributing the turn-on and turn-off signals based on a comparison of the phases of inductor currents. By distributing the turn-on and turn-off signals, the total duty cycle delivered to the output is not impacted and current sharing balance can be maintained during dynamic loading. Preferably, the turn-on signal is assigned to the lowest inductor current phase among the turned-off phases and assigning the turn-off signal to the highest inductor current phase among the turned-on phases. An advantage of embodiments in accordance with the present invention is that when the duty cycles of the output signal do not overlap, the turn-on signals control the current sharing; when the duty cycles overlap, both the turn-on and turn-off signals control the current sharing; and when the duty cycles overlap most of the time, the turn-off signals control the current sharing. Assigning the turn-on signal to the lowest inductor current phase results in a larger duty cycle being assigned to the lowest inductor current phase and assigning the turn-off signal to the highest inductor current phase results in a smaller duty cycle being assigned to the highest inductor current phase. This results in a multi-phase system that can rapidly balance the inductor currents on a cycle-by-cycle basis during dynamic loading.

In addition, embodiments of the present invention include a method for balancing current in a multi-phase power converter that uses a plurality of current sharing loops, wherein a first current sharing loop of the plurality of current sharing loops is accurate at a low frequency or DC and a second current sharing loop of the plurality of current sharing loops is accurate under conditions at which a load operates at high frequency, i.e., at a frequency greater than the loop bandwidth of the first current sharing loop. Preferably, the first current sharing loop uses the average value of the currents for balancing current and the second current sharing loop uses the instantaneous current for balancing current. The first current sharing loop, also referred to as a conventional current sharing loop, is capable handling frequencies that are under or within its loop bandwidth. Because the conventional current sharing loop uses the average current to achieve current balancing and the currents are substantially equally distributed at DC there is substantially no error in the currents. The second current sharing loop, also referred to as a switching current sharing loop, is non-linear, regulates current when there is a pulse or switching instance, is capable of handling frequencies that are higher than those that can be handled by the conventional current sharing loop, and is very fast. The switching current loop uses a pulse assign method, thus there can be error within a single switching period. An advantage of including a plurality of current sharing loops is that the conventional current sharing current loop is accurate at frequencies within its current sharing loop bandwidth and the pulse assign or switching current loop is accurate at frequencies greater than the current sharing loop bandwidth of the conventional current sharing current loop. Therefore, the use of a plurality of current sharing loops increases the accuracy of current sharing over a greater frequency range. In accordance with an embodiment of the present invention, the conventional current sharing loop may include output node 50 coupled to PWM circuit 12 through error amplifier 16, whereas the switching current sharing loop may include power stages $34_1, \ldots, 34_n$, current ordering circuit 65, and pulse assign circuit 60.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for balancing a plurality of currents in a multi-phase power converter having a plurality of outputs, comprising:
    providing a plurality of currents, wherein each current of the plurality of currents has an associated phase;
    determining whether a phase associated with one or more currents of the plurality of currents is active or inactive;
    determining current levels of the plurality of currents, wherein determining the current levels of the plurality of currents includes:
        determining which current of the plurality of currents has the lowest current level and further including activating the phase of the current of the plurality of currents that has the lowest current level; and
        determining that a first current of the plurality of currents with an associated phase that is inactive has the lowest current level and activating the phase of the first current; and determining a second current of the plurality of currents with associated phases that are inactive that has the lowest current level and activating the phase of the second current.

2. The method of claim 1, wherein determining whether a phase associated with one or more currents of the plurality of currents is active includes determining that each phase associated with the one or more currents of the plurality of currents is inactive.

3. The method of claim 1, wherein activating the phase associated with the current that has the lowest level includes changing a logic state of a first output of the plurality of outputs.

4. The method of claim 1, wherein activating the phase of the first current that has the lowest current level of the plurality of currents with associated phases that are inactive includes changing a logic state of a second output of the plurality of outputs.

5. The method of claim 1, wherein determining the current levels of the plurality of currents includes determining a third current of the plurality of currents with associated phases that are active that has the highest current level and activating the phase of the first current.

6. The method of claim 5, wherein activating the phase of the third current that has the highest current level of the plurality of currents with associated phases that are active includes changing a logic state of a first output of the plurality of outputs.

7. A method for balancing a plurality of currents in a multi-phase power converter having a plurality of outputs, comprising:
    providing a plurality of currents, wherein each current of the plurality of currents has an associated phase;
    determining whether a phase associated with one or more currents of the plurality of currents is active or inactive;
    determining current levels of the plurality of currents, wherein determining the current levels of the plurality of currents includes:
        determining which current of the plurality of currents has the lowest current level and further including activating the phase of the current of the plurality of currents that has the lowest current level; and
        determining a first current of the plurality of currents with associated phases that are active that has the highest current level and activating the phase of the first current.

8. The method of claim 7, wherein activating the phase of the first current that has the highest current level of the plurality of currents with associated phases that are active includes changing a logic state of a first output of the plurality of outputs.

9. The method of claim 7, wherein determining whether a phase associated with one or more currents of the plurality of currents is active or inactive includes determining that each phase associated with the one or more currents of the plurality of currents is active.

10. The method of claim 9, wherein determining the current levels of the plurality of currents includes determining which current of the plurality of currents has the highest current level and further including inactivating the phase of the current of the plurality of currents that has the highest current level.

11. The method of claim 10, wherein inactivating the phase of the current that has the lowest level includes changing a logic state of a first output of the plurality of outputs.

12. A method for balancing current in a multi-phase power converter, comprising:
    providing the multi-phase power converter having a pulse assign circuit that receives one or more pulse width modulated signals, wherein the pulse assign circuit has one or more outputs;
    assigning a first pulse width modulated signal of the one or more pulse width modulated signals to a first output of the one or more outputs of the pulse assign circuit, wherein the first pulse width modulated signal is associated with a first parameter;
    providing a second pulse width modulated signal of the one or more pulse width modulated signals, wherein the second pulse width modulated signal is associated with a second parameter;
    comparing the first parameter to the second parameter; and
    assigning the first pulse width modulated signal to the first output if the first parameter is greater than the second parameter.

13. The method of claim 12, wherein the first parameter is a first current and the second parameter is a second current.

14. A method for balancing current in a multi-phase power converter, comprising balancing the current in the multi-phase power converter by using a plurality of current sharing loops, a first current sharing loop of the plurality of current sharing loops for operating at a frequency less than its current sharing loop bandwidth and a second current sharing loop of the plurality of current sharing loops for operating at a frequency greater than the current sharing loop bandwidth of the first current sharing loop.

15. The method of claim 14, wherein:
    the second current sharing loop comprises the multi-phase power converter having a pulse assign circuit that receives one or more pulse width modulated signals, and wherein the pulse assign circuit has one or more outputs; and further including:
    assigning a first pulse width modulated signal of the one or more pulse width modulated signals to a first output of the one or more outputs of the pulse assign circuit, wherein the first pulse width modulated signal is associated with a first current level of a first current.

16. The method of claim 15, further including:
    providing a second pulse width modulated signal of the one or more pulse width modulated signals, wherein the second pulse width modulated signal is associated with a second current level of a second current;
    comparing the first current level to the second current level; and
    assigning the first pulse width modulated signal to the first output if the first current level is less than the second current level.

17. The method of claim 15, further including:
    providing a second pulse width modulated signal of the one or more pulse width modulated signals, wherein the second pulse width modulated signal is associated with a second current level of a second current;
    comparing the first current level to the second current level; and
    assigning the first pulse width modulated signal to the first output if the first current level is greater than the second current level.

* * * * *